United States Patent [19]
Onodera

[11] Patent Number: 4,690,794
[45] Date of Patent: Sep. 1, 1987

[54] SYSTEM FOR CONTROLLING DRIVING WATER FOR CONTROL ROD DRIVING MECHANISM OF NUCLEAR REACTOR

[75] Inventor: Katsushige Onodera, Hitachi, Japan

[73] Assignee: Hitachi, Ltd., Tokyo, Japan

[21] Appl. No.: 580,570

[22] Filed: Feb. 16, 1984

[30] Foreign Application Priority Data

Feb. 17, 1983 [JP] Japan .................................. 58-26053

[51] Int. Cl.⁴ .............................................. G21C 7/16
[52] U.S. Cl. ...................................... 376/230; 91/536
[58] Field of Search ...................... 376/230, 231, 237; 91/536

[56] References Cited

U.S. PATENT DOCUMENTS

| | | | |
|---|---|---|---|
| 3,212,409 | 10/1965 | Mash | 91/536 |
| 3,573,166 | 3/1971 | Germer | 376/230 |
| 3,632,471 | 1/1972 | Traube et al. | 376/230 |
| 3,960,284 | 6/1976 | Carpenter | 91/536 |

FOREIGN PATENT DOCUMENTS

| | | | |
|---|---|---|---|
| 58196 | 5/1979 | Japan | 376/230 |
| 112486 | 9/1979 | Japan | 376/230 |

*Primary Examiner*—Deborah L. Kyle
*Assistant Examiner*—Richard L. Klein
*Attorney, Agent, or Firm*—Fay, Sharpe, Beall, Fagan, Minnich & McKee

[57] ABSTRACT

A boiling water reactor has a plurality of control rods disposed in the reactor and adapted to be driven independently by corresponding control rod driving mechanisms, each of the control rod driving mechanisms having a hydraulic piston adapted to be actuated by pressurized water supplied thereto through a hydraulic unit annexed to each control rod driving mechanism to drive the associated control rod into and out of the reactor core. The boiling water reactor has a system for controlling the driving water for the control rod driving mechanisms. The control rod driving water control system has a control rod driving water control unit which controls the direction and velocity of movement of the hydraulic pistons. The control rod driving water control unit is used commonly for a plurality of control rod driving mechanisms. The hydraulic unit annexed to each control rod driving mechanism is provided with control rod selector valves which are adapted to be opened selectively so that the control rod driving mechanisms are selectively connected to the control rod driving water control unit.

27 Claims, 5 Drawing Figures

4,690,794

SYSTEM FOR CONTROLLING DRIVING WATER FOR CONTROL ROD DRIVING MECHANISM OF NUCLEAR REACTOR

BACKGROUND OF THE INVENTION

A typical conventional control rod driving hydraulic system for boiling water reactor will be explained first with specific reference to FIG. 1.

The control rod driving system generally has a control rod driving mechanism 1 having a hydraulic (water pressure) piston, a hydraulic unit 2 for controlling the water pressure for actuating the driving mechanism 1, and a control rod driving water pump 3 for producing the water pressure. The water pressure system includes a control rod driving water supply system A for shim operation, water supply system B for scram operation, system C for cooling the control rod driving mechanism, and a draining system D. Flow-rate regulating valves 4, pressure control valves 5, driving water headers 6, cooling water headers 7 and water drainage headers 8, all of which are known per se, are disposed at suitable portions of respective systems. Intermediate portions of the control rod driving water supplying system A are connected to valves such as control rod inserting valves 9a, 9b adapted to be opened at the time of insertion of the control rods, control rod extracting valves 10a and 10b opened at the time of extraction of the control rods, and velocity regulating valves 11a and 11b for regulating the velocity of the control rod driving water. Scram valves 12a and 12b, as well as an accumulator 13 which operates at the time of the scram operation of the reactor, are connected to an intermediate portion of the scram water supplying system B. Filters 14 are disposed at suitable portions of the control rod driving hydraulic system.

By way of reference, the control rod inserting operation of this control rod driving hydraulic system will be explained hereinunder with reference to FIG. 1.

A plurality of control rods are installed in the nuclear reactor. For inserting selected control rods into the core of the nuclear reactor, control rod inserting valves 9a and 9b corresponding to the selected control rods are opened as selector switches annexed to the control rod driving water supply system A are turned on. Therefore, the control rod driving water from the pump 3 flows through the flow-rate regulating valve 4 to the driving water header 6 and further to the selected control rod inserting valve 9a through selected branch pipes branching from the driving water header 6. The water then comes into the selected control rod driving mechanisms 1 to act on the lower surfaces of the hydraulic pistons in the mechanisms 1. As a result, each hydraulic piston produces an upward force to drive upwardly an index tube which is connected to the control rod so that the control rod is driven upwardly into the core of the reactor. Meanwhile, the water displaced by the upper surface of the hydraulic piston of the control rod driving mechanism 1 flows through the valve 9b to the water draining header 8.

For the extraction of the control rod or rods, the valves 9a and 9b are closed and the valves 10a and 10b are opened instead so that the driving water is introduced into and discharged from the driving mechanism 1 in the directions opposite to those in the rod inserting operation. Namely, the driving water is directed through the branch pipes of the driving water header 6 to the selected valves 10a and then to the selected control rod driving mechanisms 1 to act on the upper surfaces of the hydraulic pistons in these mechanisms, thereby to drive the control rod index tubes downwardly, i.e. to extract the control rods from the core of the nuclear reactor. The water displaced by the hydraulic pistons is drained through the draining header 8, past the valves 10b.

In the conventional system, the control rod driving water control unit, which is adapted to effect the control of the direction and velocity of the hydraulic pistons in the control rod driving mechanisms, are incorporated in the hydraulic units 2. As is well known, each control rod mechanism 1 has its own hydraulic unit 2. Thus the nuclear reactor is required to incorporate an impractically large number of hydraulic units. For instance, a nuclear power plant of 1,100,000 KW output necessitates a large number of, say 185, hydraulic units. Consequently, the plant as a whole has to have quite a large number of valves such as the control rod inserting valves 9a, 9b, control rod extracting valves 10a, 10b and velocity regulating valves 11a, 11b. Obviously, the increased number of valves employed correspondingly increases the chance or frequency of troubles occurring in the hydraulic unit. The large number of valves incorporated in each of the hydraulic units 2 for each of a plurality of control rod driving mechanisms inevitably prolongs the length of time for the periodical inspection of the plant. This is quite unfavourable from the view point of reduction of the rate of dosage on the workers.

SUMMARY OF THE INVENTION

Accordingly, an object of the invention is to provide a driving water control system for control rod driving mechanisms of a nuclear reactor, improved to afford an enhanced reliability of the equipments during the operation of the nuclear reactor, shortened time length for completion of inspections, reduced rate of dosage on the workers and a greater overall economy.

To this end, according to the invention, there is provided, in a boiling water reactor having a plurality of control rods disposed in the reactor and adapted to be driven independently by corresponding control rod driving mechanisms, each of the control rod driving mechanisms having a hydraulic piston adapted to be actuated by pressurized water supplied thereto through a hydraulic unit annexed to each control rod driving mechanism to drive the associated control rod into and out of the reactor core, a system for controlling the driving water for control rod driving mechanisms characterized in that a control rod driving water control unit, which controls the direction and velocity of movement of the hydraulic pistons, is used commonly for a plurality of control rod driving mechanisms, and that the hydraulic unit annexed to each control rod driving mechanism is provided with control rod selector valves which are adapted to be opened selectively so that the control rod driving mechanisms are selectively connected to the control rod driving water control unit.

DESCRIPTION OF THE PREFERRED EMBODIMENTS

The invention will be more fully understood from the following description of the preferred embodiments when the same is read in conjunction with the accompanying drawings.

Figure 2:
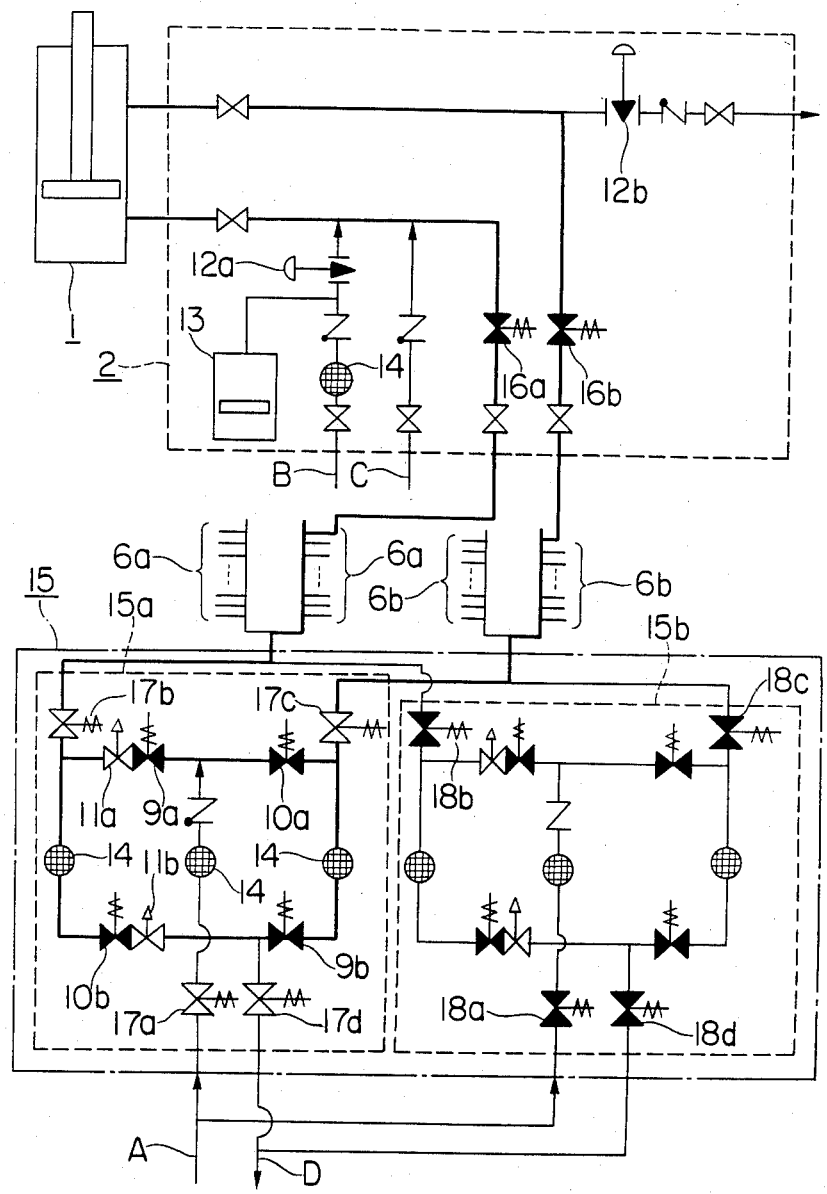
FIG. 2 is a schematic hydraulic circuit diagram of an embodiment of the control rod driving hydraulic system for a nuclear reactor in accordance with the invention.

Referring first to FIG. 2 illustrating a first embodiment, there is shown a control rod driving mechanism 1 having a hydraulic piston therein, a hydraulic unit 2 annexed to the control rod driving mechanism 1, and a control rod driving water control unit 15 which is adapted to effect the control of the direction and velocity of movement of the hydraulic piston incorporated in the control rod driving mechanism 1. The control rod driving hydraulic system includes a control rod driving water supply system A for effecting the shim control operation, scram water supply system B, cooling system C for cooling the control rod driving mechanism, and a draining system D. As in the case of the conventional system, scram valves 12a and 12b, as well as an accumulator 13 which operates at the time of the scram operation of the nuclear reactor, are connected to the intermediate portions of the scram water supply system B, as in the case of the conventional system. According to the invention, however, the control rod driving water control unit 15 is used commonly for a plurality of control rod driving mechanisms 1, 1, . . ., 1 (only one of them is shown). In addition, control rod select valves 16a and 16b are provided in the hydraulic units 2 of all control rod driving mechanisms 1 to permit the connection of the control rod driving water control unit 15 to selected ones of the control rod driving mechanisms 1.

More specifically, in the embodiment shown in FIG. 2, the control rod driving water control unit 15 includes a first control unit 15a and a second control unit 15b. Change-over valves 17a to 17d are provided in the first control unit 15a, while change-over valves 18a to 18d are provided in the second control unit 15b. Namely, in the embodiment shown in FIG. 2, the control rod driving water control unit 15 is duplicated such that two units back up each other. Namely, in the event of a failure in one of the two units, the other unit operates to back up the failed unit. Each of the first and second driving water control units 15a and 15b is provided with the control rod insertion valves 9a and 9b, control rod extraction valves 10a and 10b and velocity regulating valves 11a and 11b for regulating the velocity of the control rod driving water. In FIG. 2, reference numerals such as 9a, 9b, 10a, 10b, and 11a, 11b are attached only to the valves in the first control unit 15a, and numerals for the valves in the second control unit 15b are omitted for the clarification of the drawings. Numerals 6a and 6b show a driving water header common to all control rod driving mechanisms 1, 1, . . ., while a numeral 14 designates filters which are disposed at suitable portions of the control rod hydraulic system.

The first embodiment of the control rod driving water control system of the invention has the construction described hereinbefore. The operation of this system will be explained hereinbelow with reference to FIG. 2. For the purpose of simplification of the explanation, it is assumed here that the first control unit 15a has been selected as the control rod driving water control unit 15.

As the first control unit 15a is selected as described above, the change-over valves 17a to 17d in this control unit 15a are opened. Then, as the control rod driving mechanisms to be actuated are appointed out of all control rod criving mechanisms 1, 1, . . . by the selector switches, the control rod selector valves 16a and 16b of corresponding hydraulic units 2 are opened. At the same time, the control rod inserting valves 9a and 9b are also opened. Consequently, the control rod driving water flows to the driving water header 6a past the change-over valve 17a, control rod insertion valve 9a, velocity regulating valve 11a the change-over valve 17b. The driving water is then directed to the control rod selector valves 16a of the desired hydraulic units 2 through the header pipes branching from the driving water header 6a. The driving water is then supplied to the appointed control rod driving mechanisms 1 to apply the water pressure to the lower surfaces of the hydraulic pistons in respective control rod driving mechanisms 1 so that the index tubes connected to the control rods are moved upwardly to insert the control rods into the core of the nuclear reactor. Meanwhile, the water discharged from the control rod driving mechanisms 1 flows to the control unit 15a through the control rod selector valves 16b of respective hydraulic units 2 and past the driving water header 6b, and then introduced to the draining system through the change-over valve 17c, control valve inserting valve 9b, and the change-over valve 17d. Obviously, in the operation for extracting the control rods, the control rod extracting valves 10a and 10b are opened instead of the control rod inserting valves 9a and 9b so that the driving water flows in the reverse direction to that in the control rod inserting operation. Namely, the control rod driving water coming from the header pipes of the driving water header 6b is introduced to the appointed control rod driving mechanisms 1 through the control rod select valves 16b to exert a downward force on the upper surfaces of the hydraulic pistons of these control rod driving mechanisms 1, thereby to downwardly drive the index tubes, i.e. to extract the control rods from the reactor core. Meanwhile, the water forced out from the control rod driving mechanisms 1 is returned to the control unit 15a through the control rod selector valves 16a of respective hydraulic units 2 and the driving water header 6a. The water is then introduced to the draining system through the change-over valve 17b, control rod extracting valve 10b and the change-over valve 17a.

Thus, according to the invention, a single control rod driving water control unit 15 is used commonly for a plurality of control rod driving mechanisms 1, 1, . . . so as to effect the control of direction and velocity of the movement of the hydraulic pistons incorporated in these control rod driving mechanisms. Consequently, the total number of valves incorporated in the driving water control unit can be decreased remarkably as compared with the conventional system. The reduced number of valves affords a corresponding reduction in the number of causes of troubles in the control unit 15 to prolong the MTBF (Mean Time Between Failure) of the same advantageously. Thus, the invention is quite effective in enhancing the reliability of operation of the nuclear reactor. Furthermore, the reduction in number of valves incorporated in the control unit 15 contributes to the shortening of the time length required for periodic inspection, i.e. to the enhancement of the periodic checking work and also to the reduction of rate of dosage on the workers. The reduced number of the valves incorporated in the driving water control unit 15 means a corresponding reduction in the number of the pipes to be connected to this unit. This is quite advantageous from the view point of reduction of the cost for piping arrangement.

Figure 1:
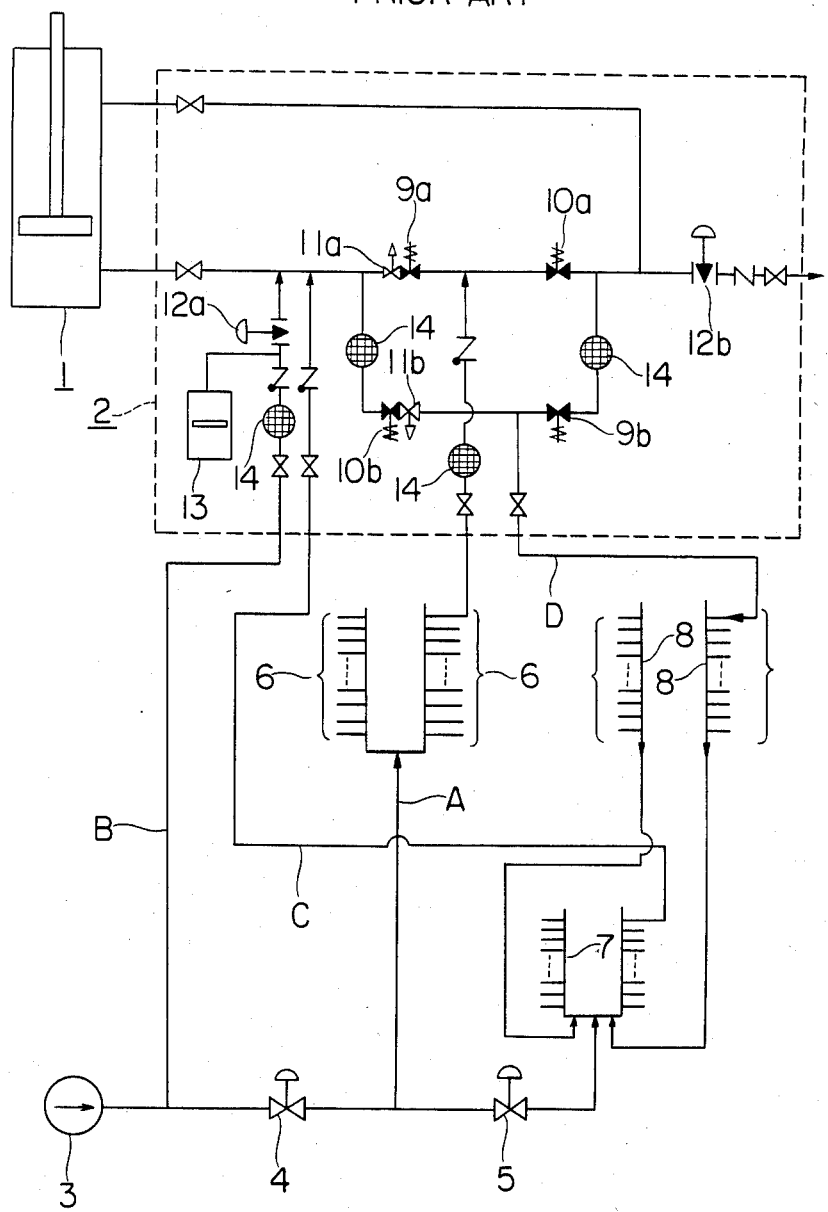
FIG. 1 is a schematic hydraulic circuit diagram of a known control rod driving hydraulic system in a conventional boiling water reactor.
Figure 3:
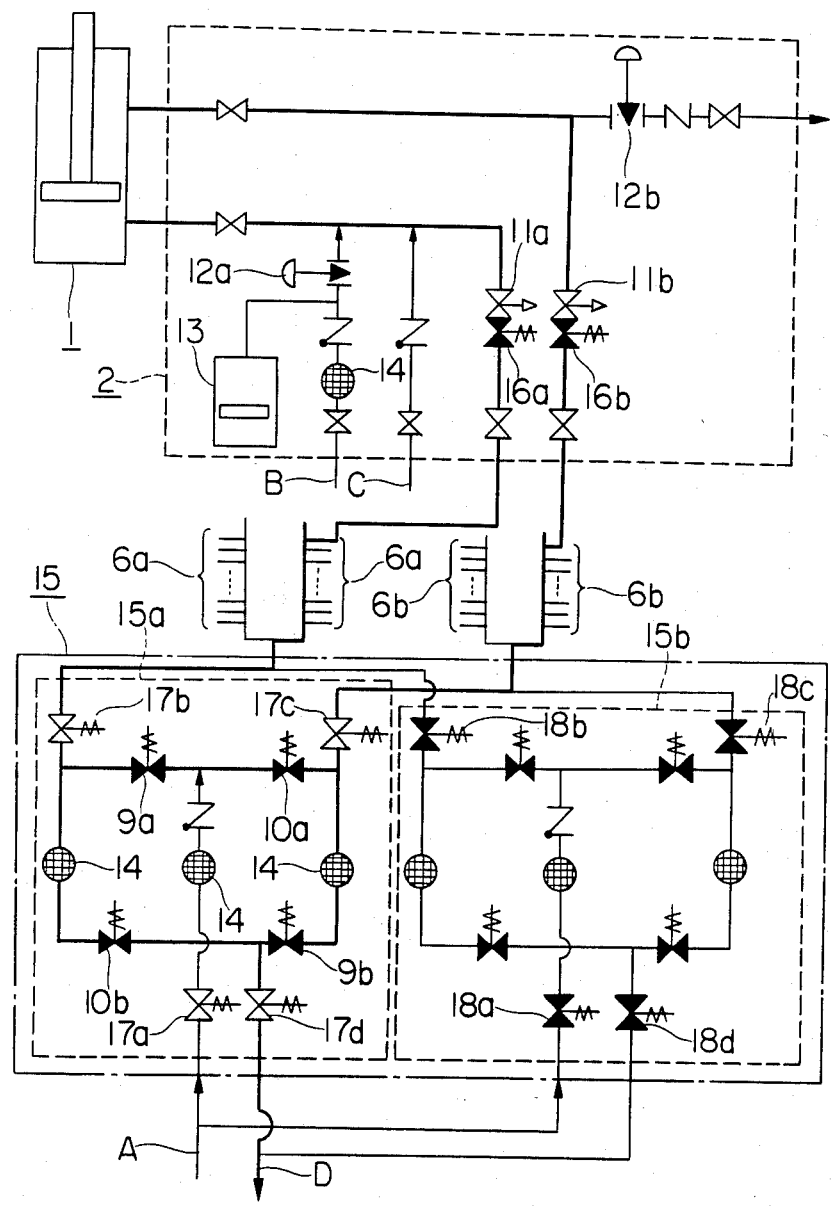
FIG. 3 is a schematic hydraulic circuit diagram of another embodiment.

FIG. 3 is a schematic hydraulic circuit diagram of another embodiment of the control rod driving system of the invention. In this Figure, parts or constituents same as those in FIG. 1 are designated at the same reference numerals, and detailed description of such parts or constituents is omitted.

In this embodiment, the hydraulic unit 2 of each control rod driving mechanism 1 is provided with velocity regulating valves 11a and 11b for regulating the velocity of the control rod driving water. According to this arrangement, it is possible to eliminate any variation in the speed of the movement of the control rods under the control of the common control rod driving water control circuit 15. Namely, in the first embodiment described before in connection with FIG. 2, the velocities of movement of the control rods are controlled commonly by the velocity control valves 11a, 11b in the common driving water control unit 15, so that the different control rods may be moved at different velocities due to differences in the rod driving conditions. In the embodiment shown in FIG. 3, however, it is possible to uniformalize the moving speed of the control rods by suitably adjusting the flow velocities of the driving water for respective control rods by means of the velocity regulating valves 11a, 11b attached to the hydraulic units annexed to respective control valve driving mechanisms.

Figure 4A:
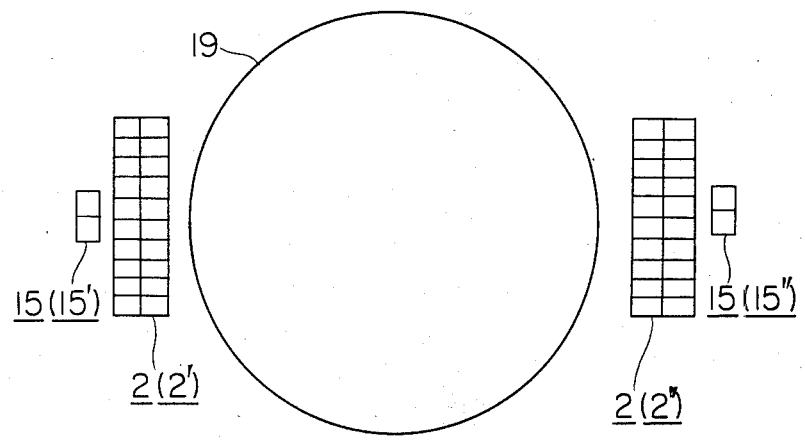
FIG. 4A is an illustration showing the arrangement of the control rod driving hydraulic units in accordance with still another embodiment of the invention.
Figure 4B:
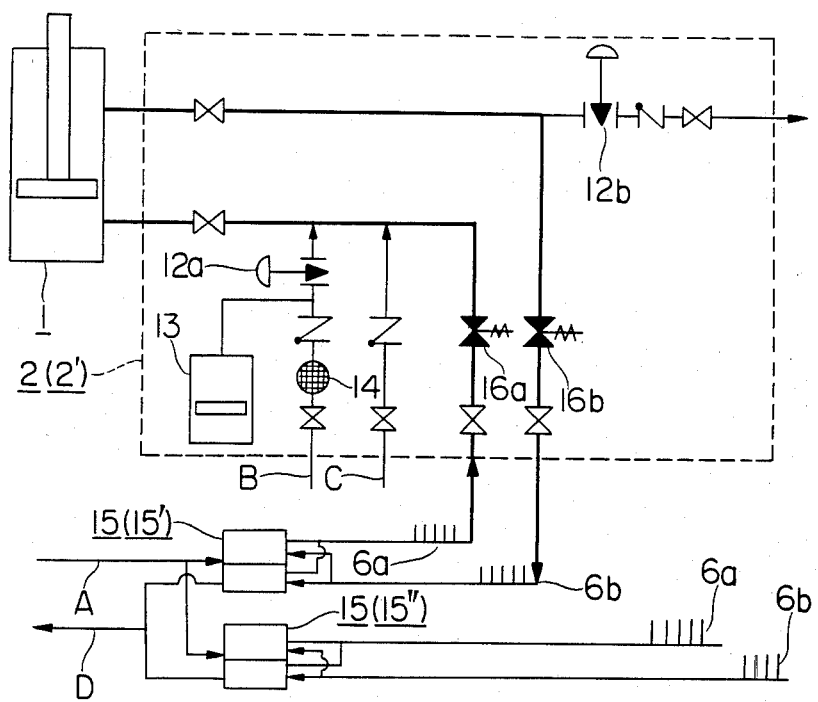
FIG. 4B is a schematic hydraulic circuit diagram of the control unit as shown in FIG. 4A.

FIG. 4A shows the arrangement of the control rod driving water control units in accordance with still another embodiment of the invention, while FIG. 4B is an illustration of the driving system of each of the control units as shown in FIG. 4A. In these Figures, the same reference numerals are used to denote the same parts or members as those used in FIG. 2. In this embodiment, hydraulic units 2', 2" are disposed at both sides of the container 19 of the nuclear reactor. Numerals 15' and 15" designate control rod driving water control units for respective hydraulic units 2' and 2". In this embodiment, all of the control rod driving mechanisms 1, 1, ... in the nuclear reactor are grouped into a plurality of blocks, and each of the blocks is provided with its own hydraulic unit 2 and the control rod driving water control unit 15. According to this arrangement, it is possible to reduce the total length of the pipes as compared with the case where the control rod driving water control unit 15 is used commonly for all control rod driving mechanisms 1, 1. For the same reason, in the embodiment shown in FIGS. 4A and 4B, it is possible to obtain sufficient room between adjacent pipes and, hence, to facilitate the piping work at the construction site.

As will be seen from the foregoing description, the invention provides a driving water control system for control rod driving mechanisms in nuclear reactors, improved to ensure an enhanced reliability of operation of the nuclear reactor, shortening of the time length in the periodic checks of the plant and a reduction of the rate of dosage on the worker, as well as a greater economy.

What is claimed is:

1. In a boiling water reactor having a plurality of control rods in the reactor and adapted to be driven independently by corresponding control rod driving mechanisms having a hydraulic piston adapted to be actuated by pressurized water supplied thereto through a hydraulic unit annexed to each control rod driving mechanism to drive the associated control rod into and out of the reactor core, a system for controlling the driving water for the control rod driving mechanism characterized in that a control rod driving water control unit, which controls the direction of movement of said hydraulic pistons, is used commonly for one or a plurality of independently selectable control rod driving mechanisms, said control rod driving water control unit including:

first conduit means for providing passage for water between said control rod driving water control unit and said hydraulic unit;

second conduit means for providing passage for the water between said control rod driving water control unit and said hydraulic unit;

system means for supplying the water, including first valve means for coupling said supplying system means to a selected one of said first and second conduit means; and system means for draining the water, including second valve means operable in conjuction with said first valve means for coupling said draining system means to the other one of said first and second conduit means; and that said hydraulic unit annexed to each control rod driving mechanism is provided with control rod selector valves which are adapted to be selectively actuated in conjuction with operation of said control rod driving water control unit to connect both inlet and outlet of each of said control rod driving mechanisms selectively to said control rod driving water control unit via not more than two conduits extending between each control rod driving mechanism and said first and second conduit means; said two conduits including:

third conduit means connectable by said selector valves to the discharge side of said first valve means, for supplying the water for driving the hydraulic piston in a first direction;

fourth conduit means connectable by said selector valves to the suction side of said second valve means, for supplying the water for driving the hydraulic piston in a second direction.

2. A system for controlling the driving water for control rod driving mechanisms as set forth in claim 1, wherein said control rod driving water control unit is provided in plural, each control rod driving water control unit being provided with change-over valves so that any selected one control rod driving water control unit may be put into operation.

3. A system for controlling the driving water for control rod driving mechanisms as set forth in claim 1, wherein said hydraulic unit annexed to each control rod driving mechanism is provided with velocity regulating valves for adjusting and regulating the velocity of said driving water supplied to each control rod driving mechanism.

4. A system for controlling the driving water for control rod driving mechanisms as set forth in claim 2, wherein said hydraulic unit annexed to each control rod driving mechanism is provided with velocity regulating valves for adjusting and regulating the velocity of said driving water supplied to each control rod driving mechanism.

5. A system for controlling driving water for control rod driving mechanisms as set forth in claim 1, wherein all of said control rod driving mechanisms are grouped into a plurality of blocks, and each of said blocks includes a combination of said hydraulic unit and said control rod driving water control unit.

6. A system for controlling driving water for control rod driving mechanisms as set forth in claim 2, wherein all of said control rod driving mechanisms are grouped into a plurality of blocks, and each of said blocks includes a combination of said hydraulic unit and said control rod driving water control units.

7. A system for controlling driving water for control rod driving mechanisms as set forth in claim 3, wherein all of said control rod driving mechanisms are grouped into a plurality of blocks, and each of said blocks includes a combination of said hydraulic unit and said control rod driving water control unit.

8. A system for controlling driving water for control rod driving mechanisms as set forth in claim 4, wherein all of said control rod driving mechanisms are grouped into a plurality of blocks, and each of said blocks includes a combination of said hydraulic unit and said control rod driving water control unit.

9. A system for controlling the driving fluid for a plurality of control rods adapted to be independently driven into and out of the core of a reactor by corresponding driving mechanisms, each of said driving mechanisms including hydraulic means actuated by pressurized fluid supplied by a hydraulic unit annexed to each driving mechanism for driving the associated control rod into and out of the reactor core, comprising:

driving fluid control means connectable in common to one or a plurality of independently selectable driving mechanisms via not more than two conduit means for conveying said pressurized fluid, extending between each driving mechanism and said driving fluid control means for controlling the direction of movement of said hydraulic means;

said control means including:

first conduit means for providing passage for fluid between said control means and said hydraulic unit;

second conduit means for providing passage for the fluid between said control means and said hydraulic unit;

supplying system means for providing the fluid, including first valve means for coupling said supplying system means to a selected one of said first second conduit means; and draining system means for receiving the fluid, including second valve means operable in conjunction with said first valve means for coupling said draining system means to the other one of said first and second conduit means; and each of said hydraulic units being provided with control rod selector valves adapted to be selectively actuated in conjunction with operation of said driving fluid control means to selectively connect both inlet and outlet of corresponding ones of said driving mechanisms to said driving fluid control means via said not more than two conduit means.

10. The system of claim 9, wherein said driving fluid control means is provided in plural, each of said driving fluid control means being provided with change-over valves whereby any selected one of said driving fluid control means may be put into operation.

11. The system of claim 9, wherein each hydraulic unit is provided with velocity regulating valves for adjusting and regulating the velocity of said driving fluid supplied to the corresponding driving mechanism.

12. The system of claim 10, wherein each hydraulic unit is provided with velocity regulating valves for adjusting and regulating the velocity of said driving fluid supplied to the corresponding driving mechanism.

13. The system of claim 9, wherein a plurality of said driving mechanisms are grouped into a plurality of blocks, and each of said blocks includes a combination of said hydraulic unit and said driving fluid control means.

14. The system of claim 10, wherein a plurality of said driving mechanisms are grouped into a plurality of blocks, and each of said blocks includes a combination of said hydraulic unit and said driving fluid control means.

15. The system of claim 11, wherein a plurality of said driving mechanisms are grouped into a plurality of blocks, and each of said blocks includes a combination of said hydraulic unit and said driving fluid control means.

16. The system of claim 12, wherein a plurality of said driving mechanisms are grouped into a plurality of blocks, and each of said block includes a combination of said hydraulic unit and said driving fluid control means.

17. A system for controlling the driving water for a control rod driving mechanism as set forth in claim 1, wherein each of said hydraulic units is further comprised of accumulator means connected to said third conduit means supplying water to drive the hydraulic piston in said first direction.

18. A system for controlling the driving water for a control rod driving mechanism as set forth in claim 2, wherein each of said hydraulic units is further comprised of accumulator means connected to said third conduit means for supplying water to drive the hydraulic piston in said first direction.

19. The system of claim 9, wherein each of said hydraulic units is further comprised of accumulator means connected to the inlet of each said corresponding ones of said driving mechanisms for supplying the fluid to drive the hydraulic means in a first direction.

20. The system of claim 10, wherein each of said hydraulic units is further commprised of accumulator means connected to the inlet of each said corresponding ones of said driving mechanisms for supplying the fluid to drive the hydraulic means in a first direction.

21. A system for controlling the driving fluid for a plurality of control rods adapted to be independently driven into and out of the core of a reactor by corresponding driving mechanisms, each of said driving mechanisms including hydraulic means actuated by pressurized fluid supplied by a hydraulic unit annexed to each driving mechanism for driving the associated control rod into and out of the reactor core, comprising:

first driving fluid control means connectable in common to one or a plurality of independently selectable driving mechanisms via not more than two conduit means for conveying said pressurized fluid, extending between each driving mechanism and said driving fluid control means for controlling the direction of movement of said hydraulic means;

second driving fluid control means connectable in common with said first driving fluid control means to one or a plurality of said independently selectable driving mechanisms via not more than said two conduit means for conveying said pressurized fluid, extending between each driving mechanism and said driving fluid control means for controlling the direction of movement of said hydraulic means;

first conduit means for providing passage for fluid between said first and second control means and said hydraulic unit;

second conduit means for providing passage for the fluid between said first and second control means and said hydraulic unit;

supplying system means for providing the fluid;

draining system means for receiving the fluid;

each of said first driving fluid control means and said second driving fluid control means including:

first valve means for coupling said supplying system means to a selected one of said first and second conduit means; and second valve means operable in conjunction with said first valve means for coupling said draining system means to the other one of said first and second conduit means;

a plurality of control rod selector valves whereby each of said hydraulic units is enabled to be via corresponding ones of said control rod selector valves, in conjunction with operation of said driving fluid control means, to selectively connect both inlet and outlet of corresponding ones of said driving mechanisms to said driving fluid control means via said not more than two conduit means.

22. The system of claim 21, wherein each hydraulic unit is provided with velocity regulating valves for adjusting and regulating the velocity of said driving fluid supplied to the corresponding driving mechanism.

23. The system of claim 21, wherein a plurality of said driving mechanisms are grouped into a plurality of blocks, and each of said blocks includes a combination of said hydraulic unit and said first and second driving fluid control means.

24. The system of claim 22, wherein a plurality of said driving mechanisms are grouped into a plurality of blocks, and each of said blocks includes a combination of said hydraulic unit and said first and second driving fluid control means.

25. The system of claim 21, wherein each of said hydraulic units is further comprised of accumulator means connected to the inlet of each said corresponding ones of said driving mechanisms for supplying the fluid to drive the hydraulic means in a first direction.

26. The system of claim 22, wherein each of said hydraulic units is further comprised of accumulator means connected to the inlet of each said corresponding ones of said driving mechanisms for supplying the fluid to drive the hydraulic means in a first direction.

27. The system of claim 23, wherein each of said hydraulic units is further comprised of accumulator means connected to the inlet of each said corresponding ones of said driving mechanisms for supplying the fluid to drive the hydraulic means in a first direction.

* * * * *